(12) United States Patent
Ferrero et al.

(10) Patent No.: US 9,156,311 B2
(45) Date of Patent: Oct. 13, 2015

(54) METHOD OF FORMING A FRONTAL TOOTHING ON AN INNER RING OF A WHEEL HUB, UPSET COLLAR AND WHEEL HUB WITH FRONTAL TOOTHING THUS OBTAINED

(75) Inventors: Alessandro Ferrero, Turin (IT); Fulvio Nicastri, Garzigliana (IT); Davide Antonio Olivieri, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 357 days.

(21) Appl. No.: 13/554,445

(22) Filed: Jul. 20, 2012

(65) Prior Publication Data

US 2013/0181504 A1 Jul. 18, 2013

(30) Foreign Application Priority Data

Jul. 29, 2011 (IT) .............................. TO2011A0704

(51) Int. Cl.
| | |
|---|---|
| B23P 17/00 | (2006.01) |
| B60B 27/06 | (2006.01) |
| B21K 21/12 | (2006.01) |
| B21K 25/00 | (2006.01) |
| B21J 5/12 | (2006.01) |
| B21J 9/02 | (2006.01) |
| B21J 13/02 | (2006.01) |
| B21K 1/30 | (2006.01) |
| B60B 31/00 | (2006.01) |

(52) U.S. Cl.
CPC ................ *B60B 27/065* (2013.01); *B21J 5/12* (2013.01); *B21J 9/025* (2013.01); *B21J 13/02* (2013.01); *B21K 1/30* (2013.01); *B21K 21/12* (2013.01); *B21K 25/00* (2013.01); *B60B 31/00* (2013.01); *Y10T 29/4992* (2015.01); *Y10T 403/7075* (2015.01)

(58) Field of Classification Search
USPC ............. 29/898.07, 898.09, 894.36, 894.361, 29/894.362; 74/434; 280/124.125; 384/544, 589
See application file for complete search history.

(56) References Cited

U.S. PATENT DOCUMENTS

| | | | |
|---|---|---|---|
| 4,893,960 A | 1/1990 | Beier et al. | |
| 7,857,520 B2 * | 12/2010 | Langer et al. | ................ 384/544 |

FOREIGN PATENT DOCUMENTS

| | | |
|---|---|---|
| EP | 1500460 A1 | 1/2005 |
| EP | 1866553 A1 | 12/2007 |
| JP | 2011031682 A | 2/2011 |

\* cited by examiner

*Primary Examiner* — Richard Chang
(74) *Attorney, Agent, or Firm* — Bryan Peckjian; SKF USA Inc. Patent Dept.

(57) ABSTRACT

A method including the steps of forming an inner ring of a wheel hub, by joining a spindle and an insert ring fitted onto the spindle, on the side of a first end of the spindle; axially blocking the insert ring on the spindle by plastically deforming the first end of the spindle so as to form an upset collar therewith, which axially protrudes from the insert ring; and once the step of forming the upset collar has finished, frontally obtaining a frontal toothing; the finished collar has, in the part of the collar which axially protrudes from the ring, a predetermined geometric shape which substantially defines, in the radial section, a scalene triangle having the base facing the upset ring and the vertex opposite the base rounded in shape.

5 Claims, 3 Drawing Sheets

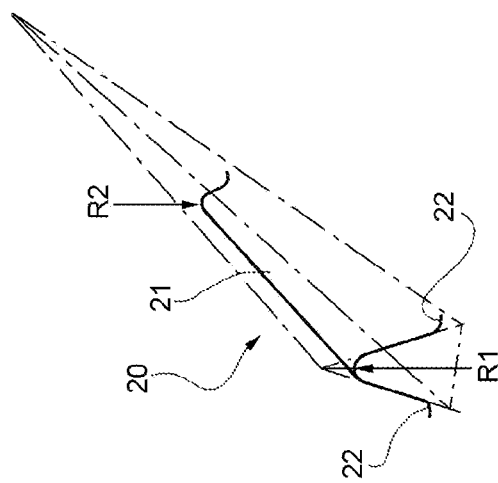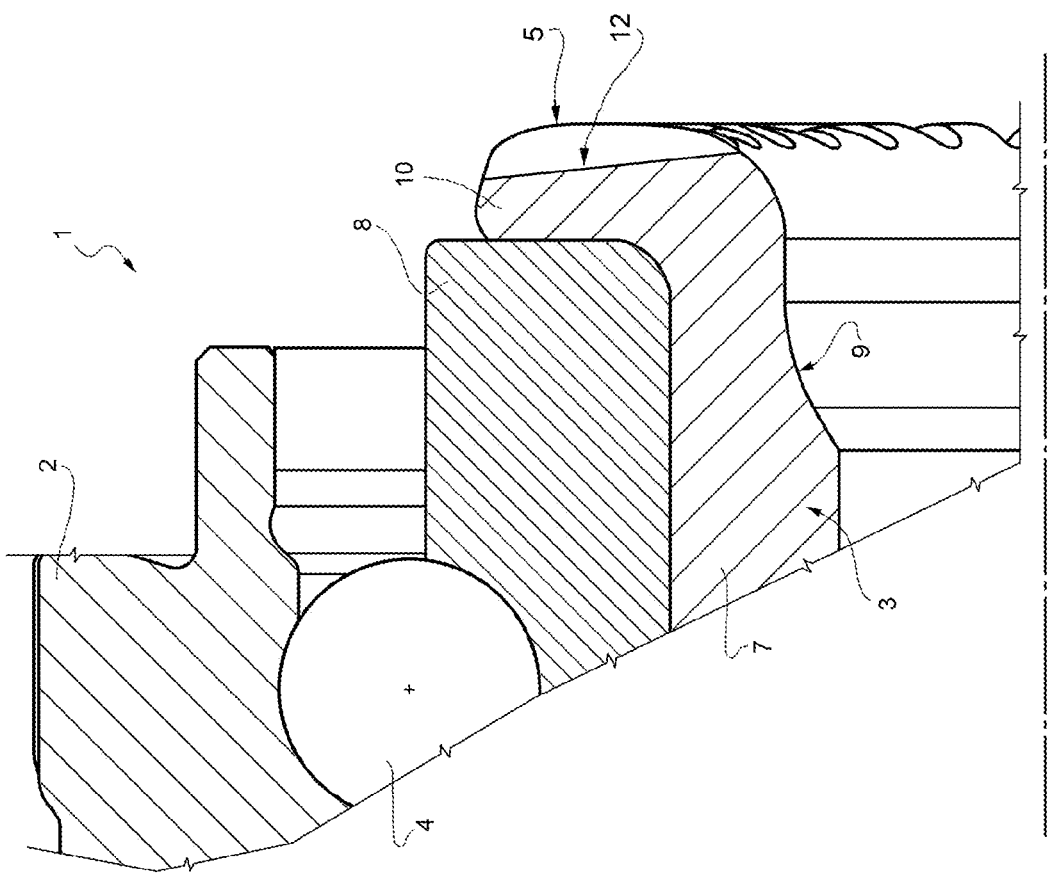

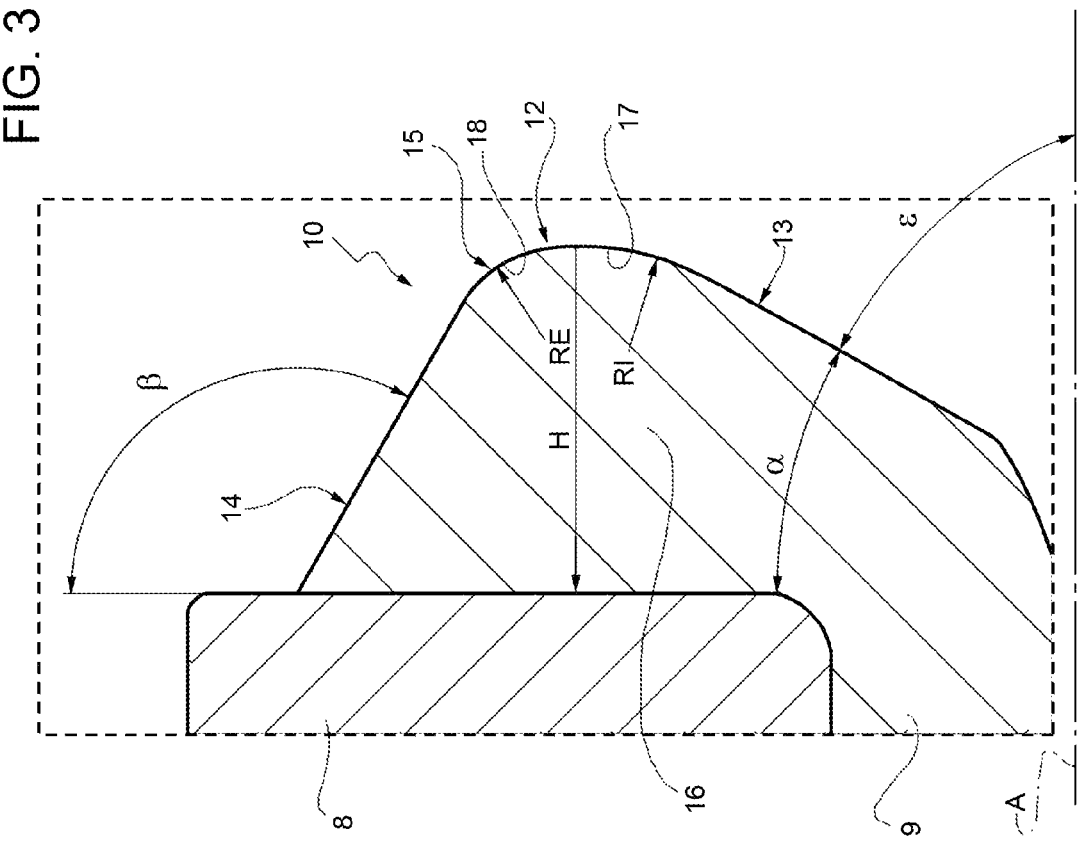
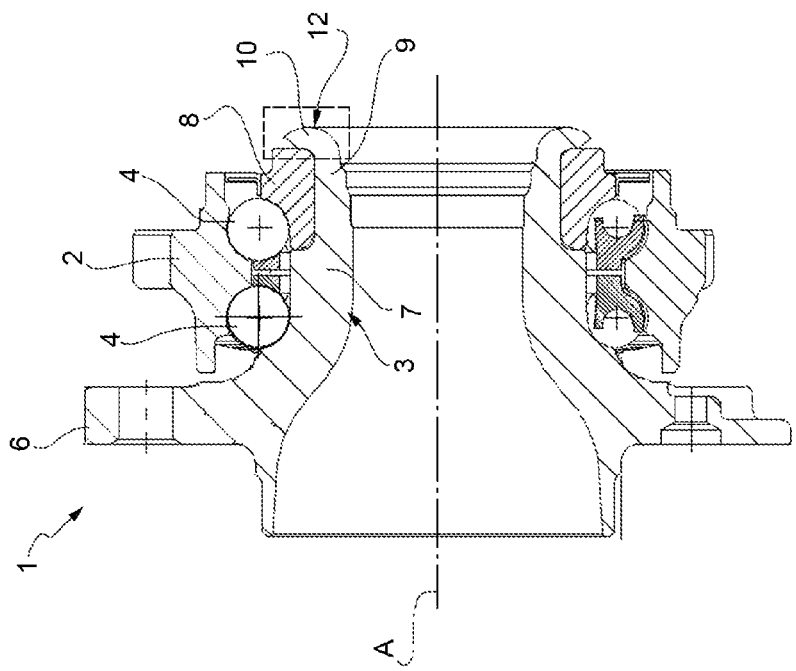

METHOD OF FORMING A FRONTAL TOOTHING ON AN INNER RING OF A WHEEL HUB, UPSET COLLAR AND WHEEL HUB WITH FRONTAL TOOTHING THUS OBTAINED

CROSS-REFERENCE TO RELATED APPLICATION

This United States Non-Provisional Utility application claims the benefit of copending Italy Provisional Patent Application Serial No. TO2011A000704, filed on 29 Jul. 2011, which is incorporated herein in its entirety.

FIELD OF THE INVENTION

The present invention relates to a method of forming a frontal toothing on an inner ring of a wheel hub by means of plastic deformation. In particular, the present invention is applied to a wheel hub, the inner ring of which comprises a spindle, provided with a first rolling race for a first crown of rolling bodies, and an insert ring, provided with a second rolling track for a second crown of rolling bodies, wherein the insert ring is axially blocked onto the spindle by means of an upset collar, defined by an end section of the spindle which was plastically deformed.

BACKGROUND OF THE INVENTION

The invention further relates to an upset collar obtained by plastically deforming the material of the mentioned spindle of the inner ring of the wheel hub and having a particular geometry intended to obtain, on the upset collar and by means of a further plastic deformation, the mentioned frontal toothing, and to a wheel hub provided with a frontal toothing obtained with such a method and having improved mechanical performance.

In the wheel hubs of the aforesaid type, the frontal toothing has the purpose of coupling head-to-head the inner ring of the wheel hub and a corresponding frontal toothing of an outer ring of a constant velocity joint, to ensure the torque transmission from the constant velocity joint to the inner ring of the wheel hub, which carries a wheel of the vehicle by means of a flanged end thereof. A coupling of this type is described in U.S. Pat. No. 4,893,960, which also teaches how to make the frontal toothing on the inner ring of the wheel hub.

EP-B-1866553 teaches how to make the terminal portion of the spindle with a particular geometry which should facilitate the operation of obtaining, by means of plastic deformation, the upset collar, and especially avoid faults during the later step of forming the frontal toothing, which is obtained by means of the so-called "orbital forming" method directly onto the upset collar, indifferently either during or after the operation of forming the same, thus further obtaining, due to the particular geometry chosen for the terminal portion of the spindle, a final profile of the top or head or ridge of the teeth, observed in the radial direction, characterized by at least one discontinuity point between a first, radially outer segment thereof having a curved profile and a second rectilinear segment, which then connects to the base of the tooth by means of a third segment, also curved.

Although the above-described methods and configurations are relatively satisfactory, they lead to obtaining toothings which are not completely reliable in terms of wheel hub-constant velocity joint durability and which are subject to possible seizures when assembling the joint.

It is thus the object of the present invention to overcome the drawbacks of the prior art and in particular to provide a method of forming a frontal toothing on an inner ring of a wheel hub by means of plastic deformation, which is capable of ensuring improved performance in terms of working torque transmission, the dimensions being equal, high reliability in terms of durability of the joint consisting of the wheel hub-constant velocity joint, and smooth meshing without seizures between the toothing according to the invention and the corresponding complementary frontal toothing obtained on the outer ring of the constant velocity joint which, unlike that on the wheel hub, is obtained by casting/forging instead of by means of plastic deformation.

SUMMARY OF THE INVENTION

According to the present invention, a method of forming a frontal toothing on an inner ring of a wheel hub by means of plastic deformation is thus provided.

Furthermore, an upset collar is provided, which is made of the plastically deformed material of a spindle of an inner ring of a wheel hub consisting of the spindle and of an insert ring mounted onto the spindle in an axially blocked manner.

Finally, according to the invention, a wheel hub is provided, which wheel hub is provided, on the inner ring thereof, with a frontal toothing.

By forming the frontal toothing only once the upset collar has been obtained with a separate operation, and by forming the upset collar according to the particular geometry of the invention. Furthermore, the step of forming the frontal toothing by means of a cold plastic deformation, which occurs on the upset collar, is simplified and made easier and less costly, both in terms of required working time and energy consumption.

The final profile of the top or head of the teeth of the frontal toothing obtained according to the invention allows a wheel hub to be provided, which is capable of coupling with the frontal toothing of the constant velocity joint in a much more reliable manner than that of the prior art, in particular capable of ensuring a prolonged durability of the constant velocity joint/wheel hub coupling, which is easy to be assembled and disassembled because it is substantially free from the danger of seizures due to the absence of discontinuities, such as sharp edges, and capable of making a better torque transmission, though maintain the same dimensions, because the tooth profile according to the invention ensures a larger contact surface between the sides of the teeth, even if the inner and outer diameters of the toothing remain equal to the prior art.

Finally, even with the same transmitted torque, contact pressures between the teeth of the frontal toothing of the wheel hub according to the invention and the teeth of the toothing of the constant velocity joint are reduced, and moreover lower localized stress concentrations are obtained along the profile of the teeth, thus ensuring a smoother (i.e. without jerking) and quieter torque transmission.

BRIEF DESCRIPTION OF THE DRAWINGS

Further features and advantages of the present invention will become apparent from the following description of non-limitative embodiments, made with reference to the accompanying drawings, in which FIG. 1 diagrammatically shows in radial section a longitudinal elevation view of an end part of a wheel hub provided with a frontal toothing made according to the invention;

FIG. 2 shows on reduced scale the wheel hub in FIG. 1 at the end of a first step of the forming method according to the invention, with the relevant detail of the wheel hub enclosed in a dashed rectangle;

FIG. 3 shows on enlarged scale the detail enclosed in the dashed rectangle of the wheel hub in FIG. 2;

FIG. 5 diagrammatically shows a perspective radial view of the design of a tooth of the toothing in FIG. 4.

DETAILED DESCRIPTION OF THE INVENTION

Figure 4:
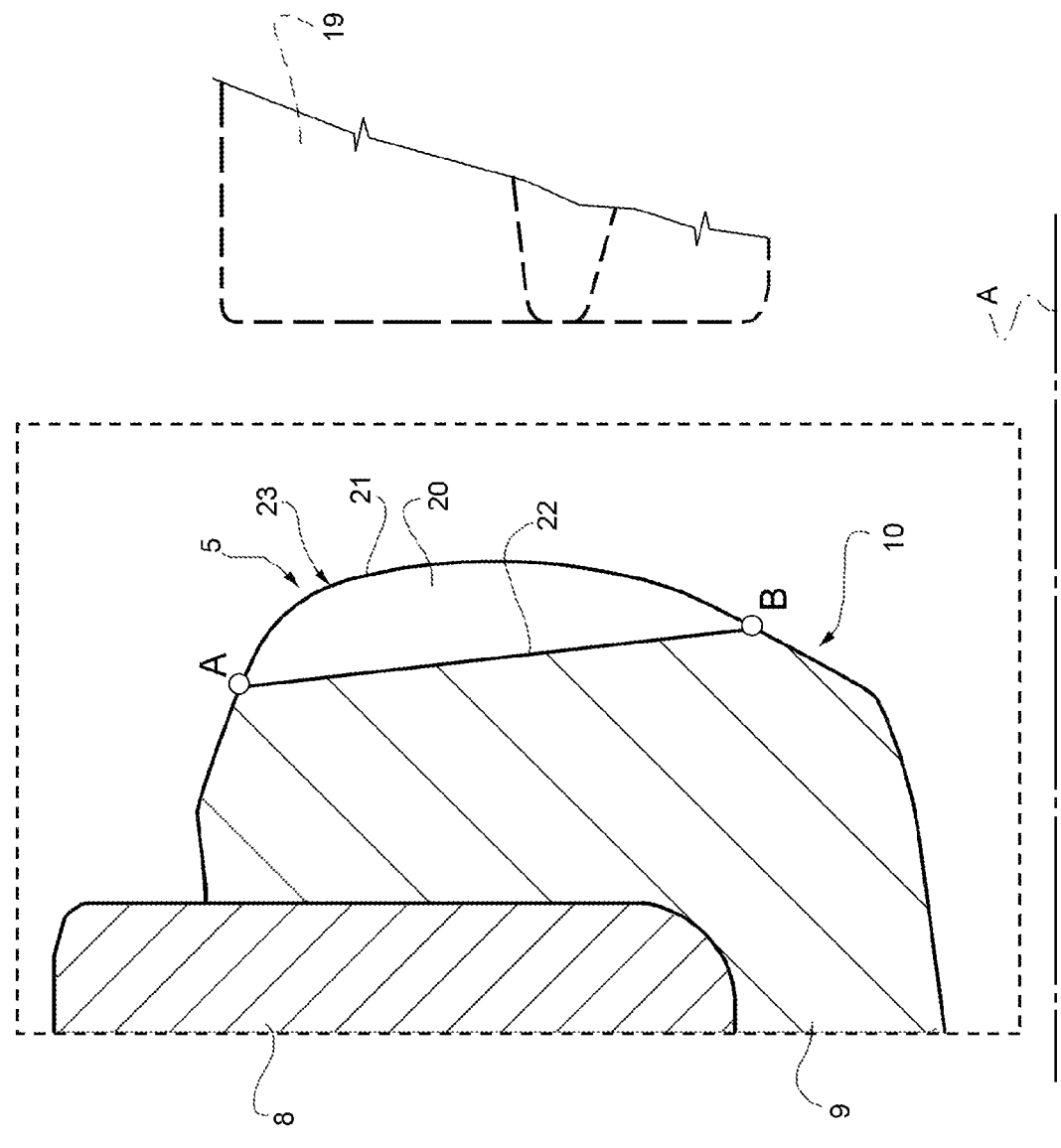
FIG. 4 shows the same detail in FIG. 3 at the end of a second step of the forming method according to the invention, by means of a frontal toothing made according to the invention.

With reference to FIGS. 1 and 2, numeral 1 indicates as a whole a wheel hub, known per se, comprising an outer ring 2, intended to be restrained in use to an upright of a vehicle suspension in a known manner, and an inner ring 3, between which two crowns of rolling bodies 4 are arranged. The inner ring 3 can be operatively associated, in use, to a constant velocity joint (known and not shown for simplicity) by means of a frontal toothing 5 and is provided with holding means 6 defined by a flange (FIG. 2) for a vehicle wheel.

In particular, according to a known configuration, the inner ring 3 comprises a spindle 7, with which the flange 6 is integrally obtained in one piece, and an "insert" ring 8 fitted onto a terminal end 9 of the spindle 7 facing the opposite side of flange 6 and, in use, the mentioned constant velocity joint; inner ring 3, spindle 7 and ring 8 are reciprocally coaxial, with respect to an axis of symmetry A of the wheel hub 1.

Ring 8 is axially blocked onto spindle 7 by means of an upset collar 10 obtained by means of plastic deformation of the terminal end 9 of spindle 7 originally axially protruding from ring 8; collar 10 axially protrudes from ring 8 and carries the frontal toothing 5 obtained on a terminal front face 12 thereof arranged substantially perpendicular to the axis of symmetry A (FIG. 2) of the wheel hub 1, in general, and of the inner ring 3, in particular.

With reference now to FIGS. 2 and 3, toothing 5 is obtained by means of a method which is distinguished from that known in the prior art by means of a specific selection of parameters and operative sequences.

Similarly to other known methods, the inner ring 3 of the wheel hub 1 is formed, as already described, as the joint between the spindle 7 and the insert ring 8 fitted onto the spindle, so that the first end 9 of the spindle axially protrudes from the insert ring 8; the insert ring 8 is then axially blocked onto the spindle 7 by plastically deforming the end 9 of the spindle so as to form the upset collar 10 therewith; finally, the frontal toothing 5 is frontally impressed on the collar 10, from the side opposite to the insert ring 8.

However, while in the prior art toothing 5 is obtained indifferently either during or after the step of forming the collar 10, according to a first aspect of the invention, the step of impressing the frontal toothing 5 is carried out only once the step of forming the collar 10 has been completed, on the fully finished collar 10; furthermore, the step of forming the collar 10 is carried out so that the finished collar has, on the part of collar 10 which axially protrudes from the insert ring 8, and in particular at the terminal frontal face 12, a predetermined geometric shape, in radial section, which is that of a substantially scalene triangle having its base facing the insert ring and the vertex opposite to the base in a rounded shape; in essence, the frontal face 12 is shaped as an asymmetric "bulge" having the above-described shape of a scalene triangle with rounded vertex in radial section.

Such a conformation, in particular if a series of constructional parameters are respected, surprisingly allows a better and more "stable" toothing 5 to be obtained by operating with a system to carry out forming operations known as orbital forming, which toothing is dimensionally better, using less energy and avoiding the typical faults of the prior art.

With specific reference to FIG. 3, the step of forming collar 10 by means of plastic deformation, also carried out using the orbital forming technique, must be carefully monitored according to the invention so that the finished part of the collar 10 which axially protrudes from the insert ring 8 comprises, as clearly seen in FIG. 3: a first conical surface 13 delimiting collar 10 radially towards the interior of the inner ring 3 and having its conicity facing the insert ring 8; a second conical surface 14 delimiting collar 10 radially towards the exterior of the inner ring 3 and having its conicity facing away from the insert ring 8; and a curved surface 15 which seamlessly connects the first and second conical surfaces 13 and 14 to each other at a portion 16 of collar 10 having the maximum thickness, i.e. having the maximum overhanging axial extension with respect to the insert ring 8.

In order to obtain the correct forming of toothing 5, it has been experimentally found that the angle α which is complementary to the angle ε formed by the conical surface 13 with the axis of symmetry A of the inner ring 3, which angle α is between the surface 13 that forms the inner lateral surface of collar 10, and the ring 8, must remain in the range from 20° to 60°; similarly, the angle β between the conical surface 14, which forms the radially outer lateral surface of collar 10, and the insert ring 8, must remain in the range from 145° to 110°. According to the method of the invention, such angles are thus made by respecting these parameters, choosing the appropriate angular values depending on the other dimensions of the wheel hub 1.

Finally, it has been found that the curved surface 15, which connects the conical surfaces 13 and 14 in a convex manner because the curvature thereof is always with its centre arranged on the side of ring 8, must be made as a mixed surface, in which a radial section profile comprises a first curvilinear portion 17 arranged on the side of surface 13 and a second curvilinear portion 18 arranged on the side of surface 14, which portions connect to each other at the maximum axial extension of collar 10 which protrudes from with respect to the insert ring, i.e. at the maximum thickness of portion 16.

After the step of forming the collar 10, the wheel hub 1 thus appears as shown in FIG. 2 and is characterized by an upset collar 10 having a combination of predetermined geometric shapes and dimensions, as previously described.

In particular, the first conical surface 13 and the second conical surface 14 are seamlessly connected to each other by the curved surface 15 at the portion 16 having the maximum overhanging axial extension with respect to the insert ring 8. The value of the maximum axial extension of collar 10 with respect to the insert ring 8, indicated by H in FIG. 3, is chosen as a function of the dimensions of the toothing 5 to be obtained, but must remain in the range from 4.5 mm to 9 mm. Furthermore, the curvature radius RI of the first curvilinear portion 17 must remain in the range from 1.5 to 7 mm; similarly, the curvature radius RE of the second curvilinear portion 18 must also remain in the range from 1.5 to 7 mm.

Radii RI and RE will be generally chosen so as to be different from each other according to other dimensional parameters of collar 10, but may also be identical. In all cases, they are chosen so that the two curvilinear portions 17 and 18 connect to each other at the maximum overhanging axial extension of collar 10, of value H, with respect to the insert ring 8, so as not to create any discontinuity, neither towards surfaces 13,14, nor on surface 15.

During the last step of the method according to the invention, the toothing 5 is impressed on the finished collar 10 having the above-described geometric and dimensional parameters by means of the method of orbital forming, using a known forming tool, diagrammatically indicated by dashed lines and with reference numeral 19 in FIG. 4. This will be made so that the toothing 5 has a plurality of teeth 20 (FIGS. 4 and 5) arranged in a circular crown about axis A, circumferentially spaced out with a constant pitch, radially directed lengthwise, having a thickness circumferentially directed with respect to axis A and a height of the teeth directed so as to be parallel to axis A.

Each tooth 20 of the frontal toothing 5 has, on a radial section plane of the wheel hub 1 represented by the sheet plane in FIG. 4, a height measured in the direction of axis A between a head or ridge 21 of tooth 20 and a base 22 of tooth 20, varying between a first point A, which is the point among all those located at the base 22 of the tooth which is in an outermost radial position, and a second point B, which is the point in all those at the base 22 of the tooth which is in an innermost radial position. At point A, the height of tooth 20 is null to then reach a maximum and then drop to a null value once again at point B.

According to an aspect of the invention, the height of each tooth 20 between point A and point B and in the radial section of the wheel hub 1, is defined by a contour 23, formed by the ridge or head 21 of tooth 20, which is everywhere free from points of discontinuity, and thus from corner edges.

Contour 23 preferably has, on a radial plane of the wheel hub 1, a curvature which is always greater than 1 mm and which is never infinite. In other words, it is a completely curved, convex (all the curvatures are centered on the part of base 22), continuous contour.

However, the contour 23 of each tooth 20 of the frontal toothing 5 may have, on a radial plane of the wheel hub, curved segments having a curvature everywhere higher than 1 mm and at least one rectilinear portion, at which the curvature tends to infinite, as long as the feature that the profile 23 is free from discontinuities is respected.

In a circumferential section with respect to axis A, each tooth 20 of the frontal toothing 5 has a wedge-like shape, a top edge of which, delimited by the head or ridge 21 of the tooth, is rounded in the circumferential direction with a curvature radius R. Such a radius R may be constant or according to a possible embodiment of the invention may preferably vary in a linear manner, in the radial direction between a maximum, indicated as R1 at the first point A, and a minimum, indicated as R2 at the second point B, and such that the curvature radius R goes to zero at the axis of symmetry A of the wheel hub 1.

The aforesaid features of the toothing 5 and of the teeth 20 thereof, which have been found to be extremely advantageous, may be obtained by means of cold plastic deformation, only providing that collar 10 is made according to the described design.

We claim:

1. A method of forming, by plastic deformation, a front toothing on an inner ring of a wheel hub, comprising the steps of:
    forming the inner ring of the wheel hub by joining a spindle and an insert ring fitted onto the spindle, on a side of a first end of the spindle and so that the first end of the spindle axially projects so as to protrude with respect to the insert ring;
    axially blocking the insert ring onto the spindle by plastically deforming the first end of the spindle to form an upset collar therewith, which axially protrudes with respect to the insert ring, and
    frontally impressing the front toothing onto the collar, on the side opposite to the insert ring; and wherein
    i) the step of impressing the front toothing is carried out only after completing the step of forming the upset collar, onto the finished collar; and
    ii) the step of forming the upset collar is carried out so that the finished collar has, in a part of the collar which axially protrudes from the insert ring, a predetermined geometric shape which substantially defines, in radial section, a scalene triangle having a base facing the insert ring, a first linear side extending from a first end of the base, a second linear side extending from a second end of the base and a rounded vertex opposite the base connecting the first linear side to the second linear side.

2. The method according to claim 1, wherein the part of collar which axially protrudes from the insert ring, before the step of impressing the front toothing, is formed to comprise:
    a first conical surface delimiting the collar radially towards the interior of the inner ring and having its conicity facing the inner ring;
    a second conical surface delimiting the collar radially towards the exterior of the inner ring and having its conicity facing away from the inner ring;
    a curved surface which uninterruptedly connects the first and second conical surfaces to each other at a portion of the collar having a maximum overhanging axial extension with respect to the inner ring.

3. The method according to claim 2, wherein an angle (α) which is complementary to an angle formed by the first conical surface with an axis of symmetry (A) of the inner ring has a value of between 20° and 60°; while an angle (β) disposed between the second conical surface and the axis of symmetry of the inner ring has a value of between 145° and 110°.

4. The method according to claim 2, wherein the curved surface that connects the first and second conical surfaces is formed as a mixed surface, a radial section profile of which comprises a first curvilinear segment arranged on a side of the first surface and a second curvilinear segment arranged on a side of the second conical surface, the two curvilinear segments connecting to each other at the maximum overhanging axial extension of the collar with respect to the insert ring.

5. The method according to claim 1, wherein the first linear side lies radially outward of the second linear side with respect to the axis of symmetry of the inner ring and wherein the first linear side extends to the insert ring and the second linear side extends radially inward of insert ring.

* * * * *